(No Model.)

W. B. NOYES.
HOOP CUTTING MACHINE.

No. 259,419. Patented June 13, 1882.

Attest:
A. Barthel
Charles J. Hunt

Inventor:
W. B. Noyes
per Thos. S. Sprague
Att'y

UNITED STATES PATENT OFFICE.

WALTER B. NOYES, OF SAGINAW, MICHIGAN, ASSIGNOR OF ONE-HALF TO WILLIE R. BENDER, OF SAME PLACE.

HOOP-CUTTING MACHINE.

SPECIFICATION forming part of Letters Patent No. 259,419, dated June 13, 1882.

Application filed February 11, 1882. (No model.)

*To all whom it may concern:*

Be it known that I, WALTER B. NOYES, of Saginaw, in the county of Saginaw and State of Michigan, have invented new and useful Improvements in Hoop-Cutting Machines; and I do hereby declare that the following is a full, clear, and exact description thereof, reference being had to the accompanying drawings, which form a part of this specification.

The nature of this invention relates to certain new and useful improvements in the construction of machines for sawing and cutting hoops from a revolving log by means of knives or saws rotating with great velocity and traveling with a reciprocating motion and lengthwise of the log.

The device for accomplishing the result sought in this invention is a machine for receiving the log, so arranged that the log may be cut or sawed either in a horizontal or perpendicular position and from end to end, the log being designed to be at rest while it is acted upon by the saws or cutters, of which I use one or more running at a high rate of speed, which cutters are thinner at their center than at their outer edge, and the velocity at which they run has a tendency to stiffen them, so that a very thin cutter can be used, and the grain of the wood will not lead them from the path of truth. There is provided a small knife and spreader combined, ahead of and behind the saw or knife which follows within the kerf, and these are so arranged that they separate the hoops or strips which have been cut from the log, and leave the surface of the log in a smooth condition, so that when one ring is sawed from the periphery of the log the next can be cut up the same way. These small knives or spreaders work automatically without any adjustment, and are operated by a rod running along the length of the slides which guide the cross-head holding the saw-arbor, the object being to form hoops or strips from the periphery of a log by cutting the same in concentric rings. To illustrate one manner of accomplishing this I refer to the drawings accompanying this specification, in which—

Figure 1:
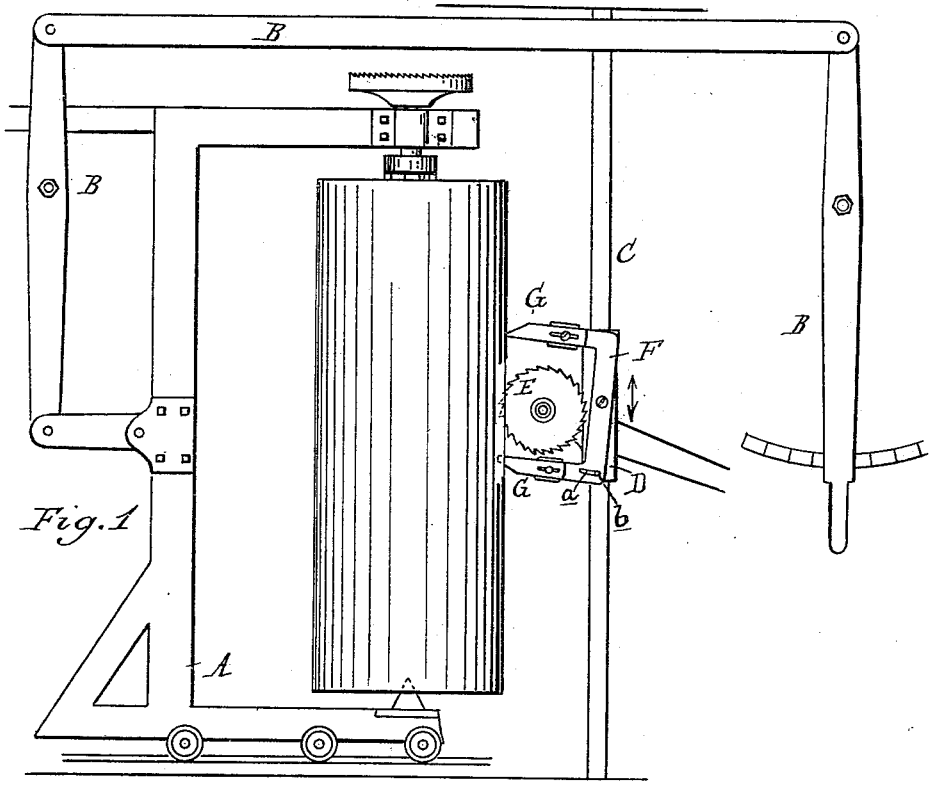
Figure 3:
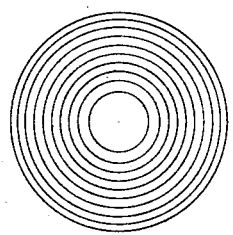
Figure 2:
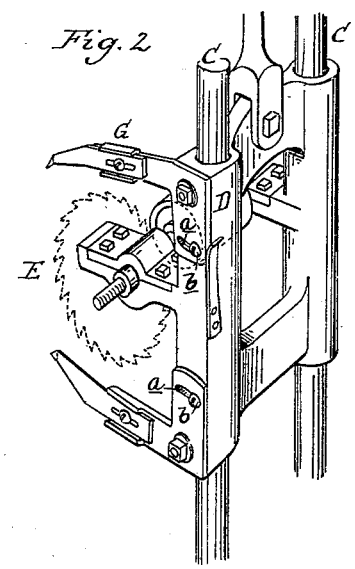

Figure 1 represents a vertical elevation; Fig. 2, a perspective of the cross-head with slight modifications; and Fig. 3, an end view, showing the circles upon which a log is cut by my device.

A represents a suitable carriage, in this instance designed to receive the log and hold the same in an upright or vertical position, the log being secured by means of any suitable chucks, while the carriage in this instance is provided with a series of levers, B, by means of which the log may be advanced to the reciprocating rotating cutters, while one of the chucks (preferably the upper one) is provided with a crown ratchet-wheel designed to be operated by any suitable arrangement of pawls, so that the log will be intermittently partially rotated after each travel of the cutters lengthwise of the periphery thereof.

C represents vertical guides, between which the cross-head has a reciprocating movement, designed preferably to receive such reciprocation, substantially in the same manner as a piston-rod in a steam-engine. This cross-head D is provided with or has journaled horizontally therein a suitable arbor, which carries the rotating cutter or saw E, of which there may be one or more, as desired, and which are rotated through the medium of a belt, or otherwise, from any convenient power. This cross-head D is also provided, as in Fig. 1, with a vibrating yoke or plate, F, which in turn is provided with cutters G, the outer ends of which are bent at right angles to their shank. These cutters are designed to travel within the kerf made by the rotating cutter, and at the same time their angle-arm, being provided with a cutting-edge, separates the strip or hoop from the base of the saw-kerf. The angular cutting-edges of the knives cause one knife, as the cross-head is moved in one direction, to enter the log to the depth of the saw-kerf, and this movement of one knife turns the holder or yoke and withdraws the other knife, the movement of the yoke or holder being limited by a slot, *a*, and pin *b*. A modification of this construction is shown in Fig. 2, in which the knives are secured rigidly but adjustably to angle-arms pivoted to the cross-heads, so that the angle-arms can turn on their pivots against the pressure of a spring when either knife is taking a back-stroke. In this manner I am enabled to cut bevel hoops or strips in concentric rings from the periphery of a log which has previously been turned in any proper machine, and without the necessity of steaming the log before cutting it.

I am aware that hoops have been heretofore cut spirally from the periphery of a log. I do not claim such invention.

What I claim as my invention is—

1. The combination, with the log-carriage A and suitable devices for operating it, of a traveling cross-head or frame and a rotary cutter, E, and two independent cutters, G G, secured to said cross-head or frame, the independent cutters being adapted to cut alternately into the log at each reciprocation of the rotary cutter, substantially as and for the purpose specified.

2. The combination, with the log-carriage A, suitable devices for operating it, and the rotary cutter E, journaled in a cross-head constructed to travel longitudinally along the log, of the independent cutters G, each secured to a holder pivoted to the cross-head, and adapted to move on the pivotal point of the holder to and from the log as the cross-head reciprocates, substantially as described.

3. The combination, with the log-carriage A and suitable devices for operating it, of the reciprocating cross-head D, the rotary cutter E, and the yoke F, pivoted to said cross-head and carrying a knife, G, at each end, substantially as described.

WALTER B. NOYES.

Witnesses:
R. KIMBALL,
WM. BINDER.